United States Patent
Gamboa et al.

(10) Patent No.: US 7,649,336 B2
(45) Date of Patent: Jan. 19, 2010

(54) POWER SUPPLY WITH BIDIRECTIONAL DC-DC CONVERTER

(75) Inventors: Paul Gamboa, Chicago, IL (US); John J C Kopera, Ortonville, MI (US)

(73) Assignee: Cobasys, LLC, Orion, MI (US)

( * ) Notice: Subject to any disclaimer, the term of this patent is extended or adjusted under 35 U.S.C. 154(b) by 21 days.

(21) Appl. No.: 11/894,209

(22) Filed: Aug. 17, 2007

(65) Prior Publication Data

US 2008/0042617 A1    Feb. 21, 2008

Related U.S. Application Data

(62) Division of application No. 11/134,999, filed on May 23, 2005.

(51) Int. Cl.
H02J 7/00    (2006.01)
(52) U.S. Cl. .................. 320/107; 320/116; 320/126; 320/150
(58) Field of Classification Search .......... 320/107, 320/144, 116, 119, 120, 124, 126, 150, 153, 320/154; 429/72
See application file for complete search history.

(56) References Cited

U.S. PATENT DOCUMENTS

| | | | |
|---|---|---|---|
| 4,810,563 A | | 3/1989 | DeGree et al. |
| 5,204,609 A | * | 4/1993 | Alisauski ................. 320/107 |
| 5,305,185 A | | 4/1994 | Samarov et al. |
| 5,767,659 A | * | 6/1998 | Farley ..................... 320/106 |
| 5,777,844 A | | 7/1998 | Kiefer |
| 5,787,576 A | | 8/1998 | Warren et al. |
| 5,795,664 A | | 8/1998 | Kelly ........................ 429/7 |
| 5,871,859 A | * | 2/1999 | Parise ...................... 320/150 |
| 5,883,497 A | | 3/1999 | Turnbull |
| 5,926,373 A | | 7/1999 | Stevens |
| 5,929,537 A | * | 7/1999 | Glennon .................... 307/46 |
| 5,952,815 A | * | 9/1999 | Rouillard et al. ............ 320/116 |
| 5,958,572 A | | 9/1999 | Schmidt et al. |
| 6,043,629 A | * | 3/2000 | Ashley et al. ............... 320/119 |
| 6,075,701 A | | 6/2000 | Ali et al. |
| 6,091,604 A | | 7/2000 | Plougsgaard et al. |
| 6,111,387 A | * | 8/2000 | Kouzu et al. ................ 320/107 |
| 6,127,801 A | * | 10/2000 | Manor ........................ 320/112 |
| 6,152,597 A | * | 11/2000 | Potega ....................... 374/185 |
| 6,222,733 B1 | | 4/2001 | Gammenthaler |
| 6,392,387 B1 | * | 5/2002 | Sage et al. .................. 320/136 |

(Continued)

FOREIGN PATENT DOCUMENTS

DE    4419467    12/1995

(Continued)

*Primary Examiner*—Patrick J Assouad
*Assistant Examiner*—Arun Williams
(74) *Attorney, Agent, or Firm*—Harness, Dickey & Pierce, P.L.C.

(57) ABSTRACT

A rechargeable DC power supply includes a housing including an interior, an exterior, and an integral heat sink including a heat absorbing surface formed in said interior and a heat dissipating surface formed in said exterior. The rechargeable DC power supply includes a rechargeable battery having battery terminals positioned in said interior, power supply terminals positioned at said exterior of said housing, and a first printed circuit board (PCB) assembly including a bidirectional DC-DC converter module connected between said battery terminals and said power supply terminals. The first PCB assembly is in coplanar contact with said heat absorbing surface.

7 Claims, 4 Drawing Sheets

U.S. PATENT DOCUMENTS

| | | |
|---|---|---|
| 6,407,922 B1 | 6/2002 | Eckblad et al. |
| 6,441,583 B1 | 8/2002 | Perelle |
| 6,495,787 B1 | 12/2002 | Nadeau et al. |
| 6,496,393 B1 * | 12/2002 | Patwardhan .................. 363/70 |
| 6,664,660 B2 | 12/2003 | Tsai ............................ 307/71 |
| 6,949,309 B2 * | 9/2005 | Moores et al. ................. 429/50 |
| 6,956,354 B2 * | 10/2005 | Lie ............................ 320/115 |
| 7,205,746 B2 * | 4/2007 | Batson ....................... 320/107 |
| 2001/0033148 A1 * | 10/2001 | Duerbaum et al. .......... 320/107 |
| 2002/0070709 A1 | 6/2002 | Small et al. |
| 2002/0186576 A1 | 12/2002 | Kanouda et al. |
| 2003/0067747 A1 * | 4/2003 | Hasegawa et al. ........... 361/695 |
| 2003/0094928 A1 * | 5/2003 | Emori et al. ................ 320/162 |
| 2003/0107352 A1 | 6/2003 | Downer et al. ................ 322/40 |
| 2003/0227275 A1 * | 12/2003 | Kishi et al. ................. 320/107 |
| 2004/0056534 A1 * | 3/2004 | Linke et al. .................... 307/75 |
| 2004/0066094 A1 * | 4/2004 | Suzuki et al. ................. 307/18 |
| 2004/0232891 A1 * | 11/2004 | Kimoto et al. .............. 320/150 |
| 2005/0029867 A1 * | 2/2005 | Wood ........................ 307/10.1 |
| 2005/0084745 A1 | 4/2005 | Colello et al. |
| 2005/0151517 A1 * | 7/2005 | Cook et al. ................. 323/207 |
| 2005/0269995 A1 * | 12/2005 | Donnelly et al. ............ 320/150 |
| 2005/0275374 A1 | 12/2005 | Guang et al. ............... 320/116 |

FOREIGN PATENT DOCUMENTS

| | | |
|---|---|---|
| JP | 2000133224 | 12/2000 |

* cited by examiner

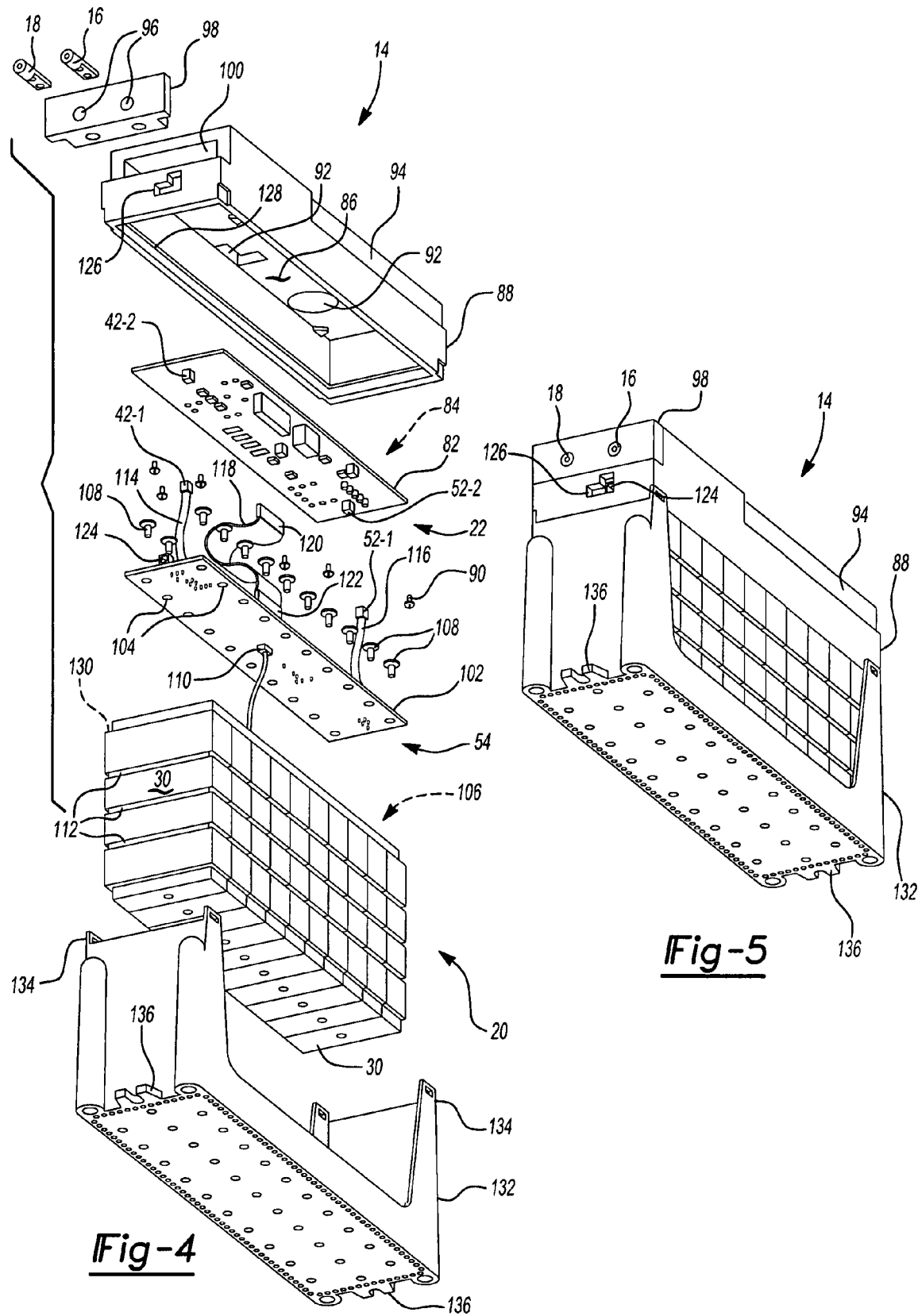

POWER SUPPLY WITH BIDIRECTIONAL DC-DC CONVERTER

CROSS-REFERENCE TO RELATED APPLICATIONS

This application is a Divisional Application of U.S. patent application Ser. No. 11/134,999 filed on May 23, 2005. The disclosure of the above application is incorporated herein by reference.

FIELD OF THE INVENTION

The present invention relates generally to rechargeable DC power supplies having an integral DC-DC converter.

BACKGROUND OF THE INVENTION

Rechargeable DC power supplies are useful in many types of applications. For example, cellular towers and other stationary applications use rechargeable DC power supplies as an uninterruptible power source. The rechargeable DC power supplies provide backup power during a main grid outage.

Referring now to FIG. 1, an example application of rechargeable DC power supplies is shown. A direct current (DC) power supply 2 receives power from a main grid 4. The DC power supply 2 generally provides power to a load 6 and to a plurality of rechargeable DC power supplies 8-1, 8-2, ..., 8-N, referred to collectively as rechargeable DC power supplies 8. Each rechargeable DC power supply 8 includes a corresponding battery 10 and charging control circuit 12.

The battery 10 provides a voltage that is less than a load voltage needed by the load 6. If the DC power supply 2 becomes inoperative, the series-connected rechargeable DC power supplies 8 provide the load voltage. However, because the rechargeable DC power supplies are connected in series, the load 6 may not receive sufficient voltage if one of more of the rechargeable DC power supplies 8 is in a discharged or open circuit condition.

SUMMARY OF THE INVENTION

A telecommunication switching station includes telecommunication equipment, a DC power supply having an output connected to the telecommunication equipment, and a plurality of rechargeable DC power supplies connected in parallel with the output of the DC power supply. Each DC power supply includes a pair of power supply terminals, a rechargeable battery, and a bidirectional DC-DC converter module connected between the rechargeable battery and the pair of power supply terminals. The DC power supply provides power to the telecommunication equipment and recharges the plurality of rechargeable DC power supplies. The plurality of rechargeable DC power supplies serve as a back-up for the DC power supply.

In other features, each of said rechargeable DC power supplies further includes a control module that communicates an enable signal to a respective one of said bidirectional DC-DC converter modules. The respective bidirectional DC-DC converter module selectively creates an open circuit condition between said pair of power supply terminals in accordance with said enable signal.

In other features, each of said rechargeable DC power supplies further includes a data communication port in communication with a respective one of said control modules. Each of said rechargeable DC power supplies can further includes a battery temperature sensor positioned in proximity of a respective one of said rechargeable batteries and providing a battery temperature signal to a respective one of said control modules. Each battery temperature sensor is positioned inside of said respective one of said rechargeable batteries.

In other features, each rechargeable DC power supplies further includes a current sensor providing a signal to a respective one of said control modules and being connected between a respective one of said rechargeable batteries and a respective one of said bidirectional DC-DC converter modules. The signal can be indicative of a magnitude and direction of current flow through said respective one of said rechargeable batteries.

In other features, each of the rechargeable DC power supplies further includes a switch having a control input and being connected between a respective one of said rechargeable batteries and a respective one of said bidirectional DC-DC converter modules and wherein said switch opens and closes in response to said control input.

In other features, each of said control modules can communicate a desired output voltage signal to said respective one of said bidirectional DC-DC converter modules. The respective one of said bidirectional DC-DC converter modules regulates a load voltage across a respective one of said pair of power supply terminals in accordance with said desired output voltage signal.

A rechargeable DC power supply includes a housing including an interior, an exterior, and an integral heat sink including a heat absorbing surface formed in said interior and a heat dissipating surface formed in said exterior. The rechargeable DC power supply includes a rechargeable battery having battery terminals positioned in said interior, power supply terminals positioned at said exterior of said housing, and a first printed circuit board (PCB) assembly including a bidirectional DC-DC converter module connected between said battery terminals and said power supply terminals. The first PCB assembly is in coplanar contact with said heat absorbing surface.

In other features, a battery tray is connected to said housing and contains said rechargeable battery. The rechargeable battery can include a plurality of rechargeable cells having cell terminals. A second PCB assembly can be positioned on said cell terminals and include PCB traces connecting said cell terminals to form said battery terminals. The housing can nest on said rechargeable battery.

In other features, the rechargeable DC power supply can include a battery temperature sensor positioned in proximity of said rechargeable battery and connected to said second PCB assembly. The battery temperature sensor can be located inside of said battery.

In other features, a control module is positioned in the interior of said housing and has a data communication port. A connector in communication with said data communication port can be accessible from said exterior of said housing.

A rechargeable DC power supply system for providing power to a DC load, includes a plurality of rechargeable DC power supplies. Each rechargeable DC power supply includes a rechargeable battery, a pair of power supply terminals, a bidirectional DC-DC converter module connected between said rechargeable battery and said power supply terminals, and a controller module receiving at least one signal indicative of a condition of said rechargeable battery and communicating an enable signal to said corresponding bidirectional DC-DC converter module in accordance with said condition. Said power supply terminals of said plurality of rechargeable DC power supplies and said load are connected by parallel connections. One of said enable signals causes a respective one of said corresponding rechargeable DC power supplies to electrically connect and disconnect from said load. Each of said rechargeable DC power supplies can include a data communication port that communicates data indicative of said condition.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4 is an exploded view of a rechargeable DC power supply;

FIG. 5 is a perspective view of the rechargeable DC power supply of FIG. 4; and

DETAILED DESCRIPTION OF THE PREFERRED EMBODIMENTS

Figure 1:
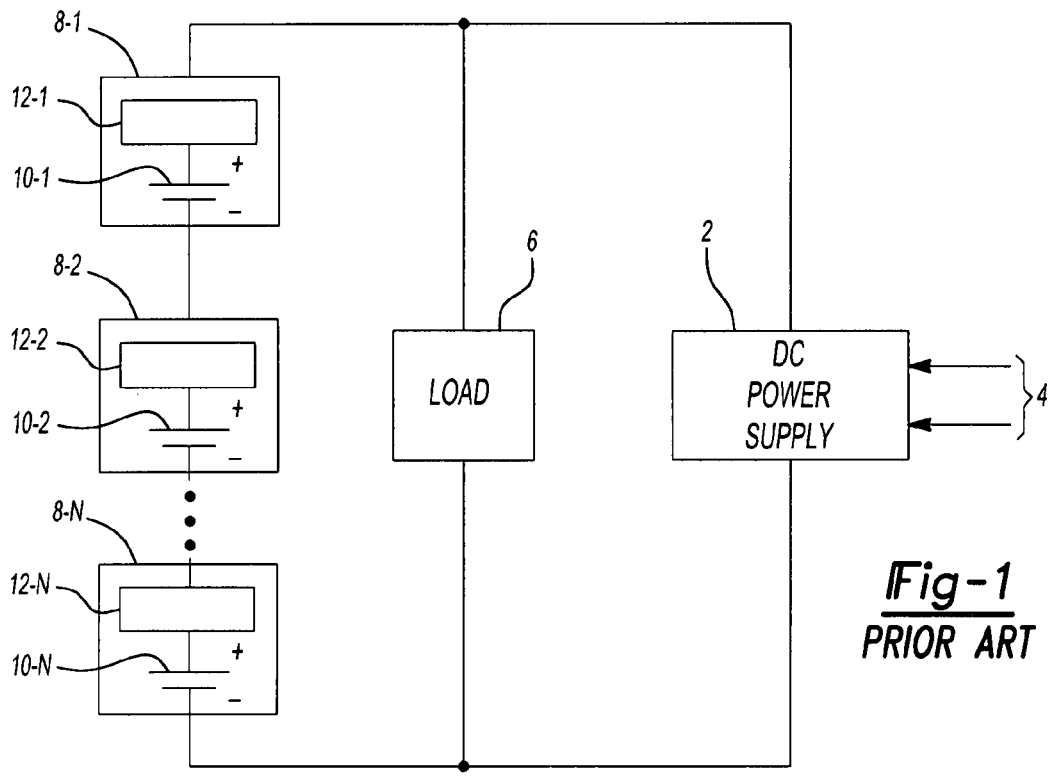
FIG. 1 is a functional block diagram of a load connected to a DC power supply and series-connected rechargeable DC power supplies according to the prior art.

The following description of the preferred embodiment(s) is merely exemplary in nature and is in no way intended to limit the invention, its application, or uses. For purposes of clarity, the same reference numbers will be used in the drawings to identify similar elements. As used herein, the term module and/or device refers to an application specific integrated circuit (ASIC), an electronic circuit, a processor (shared, dedicated, or group), and memory that execute one or more software or firmware programs, a combinational logic circuit, and/or other suitable components that provide the described functionality. For purposes of clarity, the same reference numerals will be used to identify similar elements.

Figure 2:
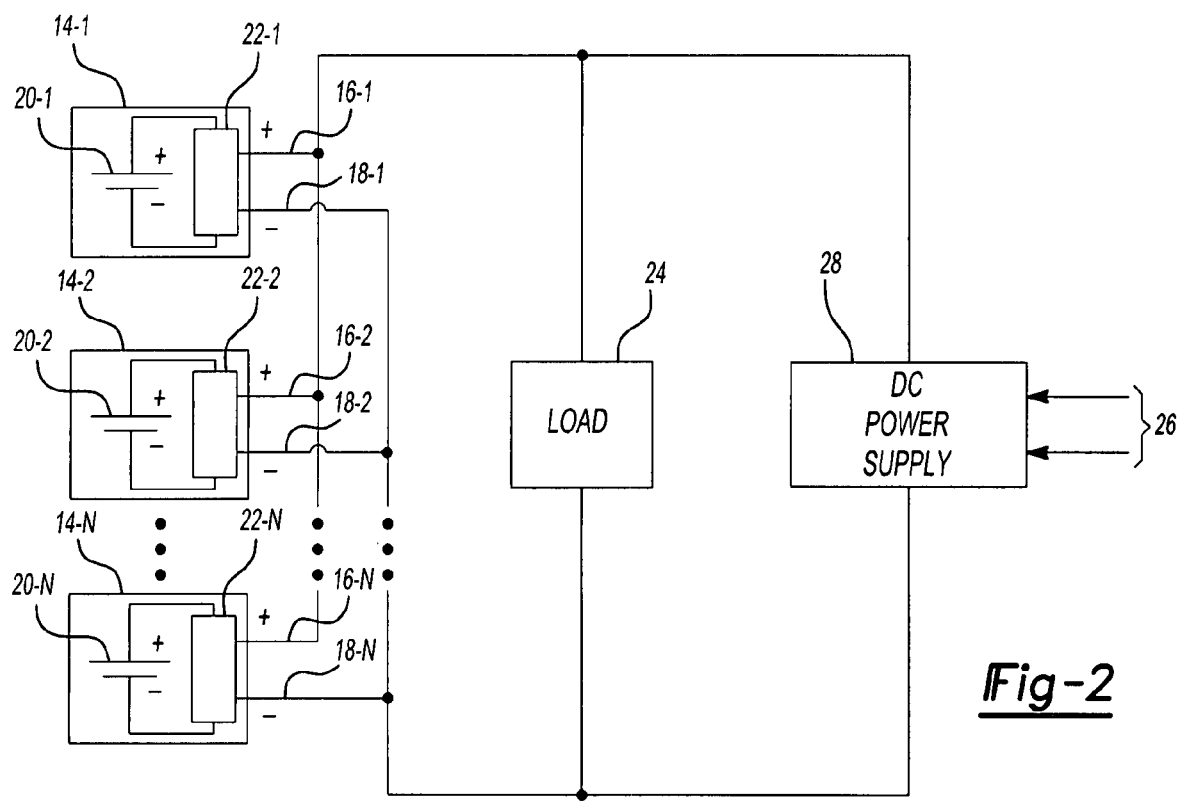
FIG. 2 is a functional block diagram of a load connected to a DC power supply and parallel-connected rechargeable DC power supplies.

Referring now to FIG. 2, a plurality of rechargeable DC power supplies 14-1, 14-2, . . . , 14-N, referred to collectively as rechargeable DC power supplies 14, are shown. The rechargeable DC power supplies 14 include corresponding positive 16 and negative 18 power supply terminals that are connected in parallel. Each rechargeable DC power supply 14 has a corresponding rechargeable battery 20 and a bidirectional DC-DC converter module 22 connected between the battery 20 and the positive 16 and negative 18 power supply terminals. A battery voltage of each battery 20 can be less than a DC load voltage needed by a load 24. Examples of loads include, by way of non-limiting example, telecommunication equipment including multiplexers and/or switching circuitry, cellular communications transmitters and/or receivers, and electric and hybrid electric vehicles. The bidirectional DC-DC converter modules 22 convert the battery voltage to the load voltage and vice versa. In some embodiments, the battery voltage is about 12V and the load voltage is between about 24V and 48V. The load 24 connects to the positive 16 and negative 18 power supply terminals.

A main grid 26 provides power to a DC power supply 28. The DC power supply 28 has positive and negative outputs connected to the load 24 and to the positive 16 and negative 18 power supply terminals. The main grid 26 can be an AC line voltage, such as provided by a public electric utility, or a DC line voltage such as may be provided by an alternative energy source such as solar cells and/or generators.

When the main grid 26 is powered, the DC power supply 28 provides power to operate the load 24 and to recharge the batteries 20. The bidirectional DC-DC converter modules 22 reduce the load voltage to the battery voltage and regulate a charging current provided to the batteries 20.

When the main grid 26 loses power, the rechargeable DC power supplies 14 provide power to operate the load 24. The bidirectional DC-DC converter modules 22 increase the battery voltage to the load voltage.

Figure 3:
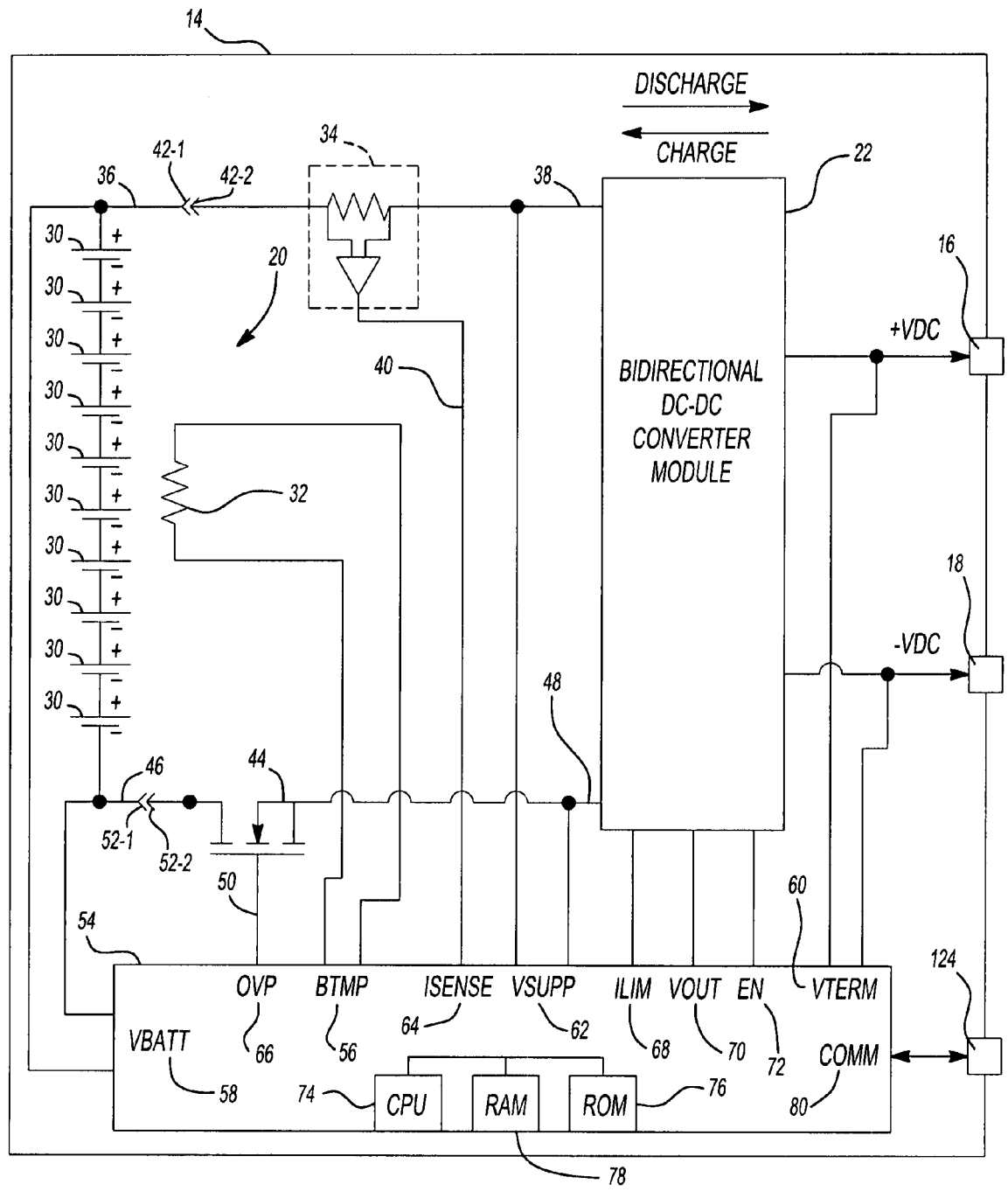
FIG. 3 is a functional block diagram of a rechargeable DC power supply including a bidirectional DC-DC converter.

Turning now to FIG. 3, a functional block diagram of the rechargeable DC power supply 14 is shown. The rechargeable battery 20 has at least one rechargeable cell 30, such as, by way of non-limiting example, nickel-metal hydride, nickel-cadmium, lithium-ion, and/or lead-acid cells. The rechargeable cells 30 can connect in series, parallel, or series-parallel. A battery temperature sensor 32 can be positioned in proximity of the battery 20. In some embodiments, the temperature sensor 32 is positioned between two of the cells 30 and near a center of mass of the battery 20. By way of non-limiting example, the battery temperature sensor 32 can be a thermistor having a negative temperature coefficient.

A current sensor 34 can connect between a positive battery terminal 36 and a positive module terminal 38 of the bidirectional DC-DC converter module 22. The current sensor 34 provides a current signal 40 indicative of a magnitude of battery current flowing through the battery 20. In some embodiments, the current signal 40 also provides an indication of a direction of the battery current. First mating connectors 42-1 and 42-2, referred to collectively as the first connector 42, can be used between the positive battery terminal 36 and the current sensor 34. The first connector 42 facilitates installation and removal of the battery 20.

A switch 44 selectively connects a negative battery terminal 46 to a negative module terminal 48 of the bidirectional DC-DC converter module 22. The switch 44 has a switch control input 50 that controls whether the switch 44 is open or closed. In some embodiments, the switch 44 can be a transistor, electromechanical relay, or solid-state relay. Second mating connectors 52-1 and 52-2, referred to collectively as the second connector 52, can be used between the negative battery terminal 46 and the switch 44 to facilitate installation and removal of the battery 20. The DC-DC converter module 22 can include the current sensor 34 and/or the switch 44.

A control module 54 receives various signals indicative of voltages and current in the rechargeable DC power supply 14. A battery temperature input 56 connects to the battery temperature sensor 32. A battery voltage input 58 connects to the positive battery terminal 36 and the negative battery terminal 46. A terminal voltage input 60 connects to the positive power supply terminal 16 and the negative power supply terminal 18. A supply voltage input 62 connects to the positive module terminal 38 and the negative module terminal 48. A current sense input 64 connects to the current signal 40. The control module 54 senses the load voltage through the terminal voltage inputs 60.

The control module 54 also provides a number of output signals. An over-voltage protection (OVP) output 66 connects to the switch control input 50. A current limit signal 68, a desired output voltage signal 70, and an enable signal 72 connect to the bidirectional DC-DC converter module 22. The bidirectional DC-DC converter module 22 uses the current limit signal 68 to limit the battery current. The bidirectional DC-DC converter module 22 uses the desired output voltage signal 70 to establish the load voltage at the positive 16 and negative 18 power supply terminals. For example, the desired output voltage signal 70 can indicate that the load voltage should be set to a value between about 24V and 48V. The bidirectional DC-DC converter module 22 uses the enable signal 72 to turn the positive 16 and negative 18 power supply terminals on and off. The positive 16 and negative 18 power supply terminals are turned on during normal operation. However, if the rechargeable DC power supply 14 is supposed to be providing power to the load 24 and some condition prevents it from doing so, such as the battery 26 is discharged, then the controller 54 can use the enable signal 72 to turn off the positive 16 and negative 18 power supply terminals. This electrically disconnects the rechargeable DC power supply 14 from the load 24 and also prevents it from undesirably discharging the other rechargeable DC power supplies 14.

A CPU 74 uses the inputs and outputs of the control module 54. The CPU 74 executes a computer program stored in a read-only memory (ROM) 76. The ROM 76 can include other types of non-volatile computer memory, such as, by way of non-limiting example, flash, EPROM, and/or EEPROM. The CPU 74 stores variables, such as the load voltage, battery voltage, and battery current, in a random access memory (RAM) 78. The control module 54 can also have a bidirectional data communication port 80 in communication with the CPU 74. A user can access the data communication port 80 and interact with the CPU 74 to read the variables from the RAM 78 and/or change the computer program stored in the ROM 76. By way of non-limiting example, the data communication port 80 can be serial, parallel, RS-232, controller area network (CAN), and/or Ethernet.

Turning now to FIG. 4, an exploded view is shown of one of various embodiments of the rechargeable DC power supply 14. The bidirectional DC-DC converter module 22 can be assembled on a first printed circuit board (PCB) 82. The first PCB 82 has at least one planar area on an upper surface 84 that comes into coplanar contact with a planar heat absorbing surface 86 located on an interior of a housing 88. The region of coplanar contact between the planar area of the first PCB 82 and the heat-absorbing surface 86 can contain a material that enhances thermal conductivity, such as a thermal compound or a thermal pad. One or more screws 90 can engage the housing 88 and bias the planar area of the first PCB 82 towards the heat-absorbing surface 86. Springs and/or clamps can also be used to supplement, or as substitute for, the function of the screws 90. The heat-absorbing surface 86 can include one or more recesses 92 that accommodate components positioned on the upper surface 84. An exterior of the housing 88 can include a heat-dissipating portion 94, such as fins, pins, fluid channels, or other structure to dissipate heat from the housing 88.

Openings 96 formed in a terminal plate 98 receive the positive and negative power supply terminals 16, 18. The terminal plate 98 should be formed of an insulating material to prevent the positive and negative power supply terminals 16, 18 from shorting together. Alternatively, the terminal plate 98 can be formed from a conductive material and insulators can be positioned in the openings 96 between the positive and negative power supply terminals 16, 18 and the terminal plate 98. The housing 88 has an opening 100 that receives the terminal plate 98 and allows the positive and negative power supply terminals 16, 18 to connect to the first PCB 82.

The control module 54 can be assembled on a second PCB 102. The second PCB 102 has a plurality of terminals 104, such as plated-through holes, adapted to connect to positive and negative terminals located on a top 106 of each cell 30. Circuit traces on the second PCB 102 connect the terminals 104. The circuit traces make the connections between the cells 30 and provide the positive and negative battery terminals 36, 46. An arrangement of the circuit traces depends on whether the battery 20 includes cells 30 connected in a series, parallel, or series-parallel manner. Fasteners, such as screws 108, secure the connection between the terminals 104 and the terminals of each cell 30. Alternatively, the terminals 104 can be adapted to connect directly to the positive and negative battery terminals 36, 46 when the connections between the cells 30 are integral with the battery 20.

A connector 110 can be located on the second PCB 102 to make the connection between the battery temperature sensor 32 and the control module 54. One or more straps 112 can urge the cells 30 together. The straps 112 can help reduce bending moments or other stresses in the second PCB 102.

A positive battery cable 114, a negative battery cable 116, and a ribbon cable 118 provide connections between the first PCB 82 and the second PCB 102. The positive battery cable 114 has one end connected to the positive battery terminal 36 formed on the second PCB 102. The other end of the positive battery cable 114 is fitted with the first mating connector 42-1. The first mating connector 42-1 connects to the second mating connector 42-2, which mounts on the first PCB 82. The negative battery cable 116 has one end connected to the negative battery terminal 46 formed on the second PCB 102. The other end of the negative battery cable 116 is fitted with the first mating connector 52-1. The first mating connector 52-1 connects to the second mating connector 52-2, which mounts on the first PCB 82. One end of the ribbon cable 118 connects to the first PCB 82 and the other end connects to the second PCB 102. The ends of the ribbon cable 118 can be fitted with connectors 120, 122 that plug into mating connectors on the first and second PCBs 82, 102. The ribbon cable 118 carries the control module 54 signals between the first and second PCBs 82, 102. In some embodiments, all hardware except the positive and negative power supply terminals 16, 18 and the battery temperature sensor 32, can be on a single PCB. The single PCB would then provide the functionality of the first and second PCBs 82, 102.

The second PCB 102 includes a communication connector 124 connected to the communication port 80. The communication connector 124 aligns with an opening 126 in the housing 88.

The housing 88 is adapted to nest on top of the battery 20. In one adaptation, the housing 88 can have a peripheral ledge 128 formed around its interior. The peripheral ledge 128 rests upon a mating ledge 130 formed in a top periphery of the battery 20. When the housing 88 nests on top of the battery 20, the interior of the housing 88 encloses the first PCB 82, the second PCB 102, and the positive and negative battery terminals 36, 46.

A battery tray 132 contains the battery 20 and has upstanding portions 134 that secure to the housing 88. The battery tray 132 can include integral mounting tabs 136. The mounting tabs 136 facilitate fastening the rechargeable DC power supply 14 to a supporting surface. FIG. 5 shows one of various embodiments of an assembled rechargeable DC power supply 14.

Figure 6:
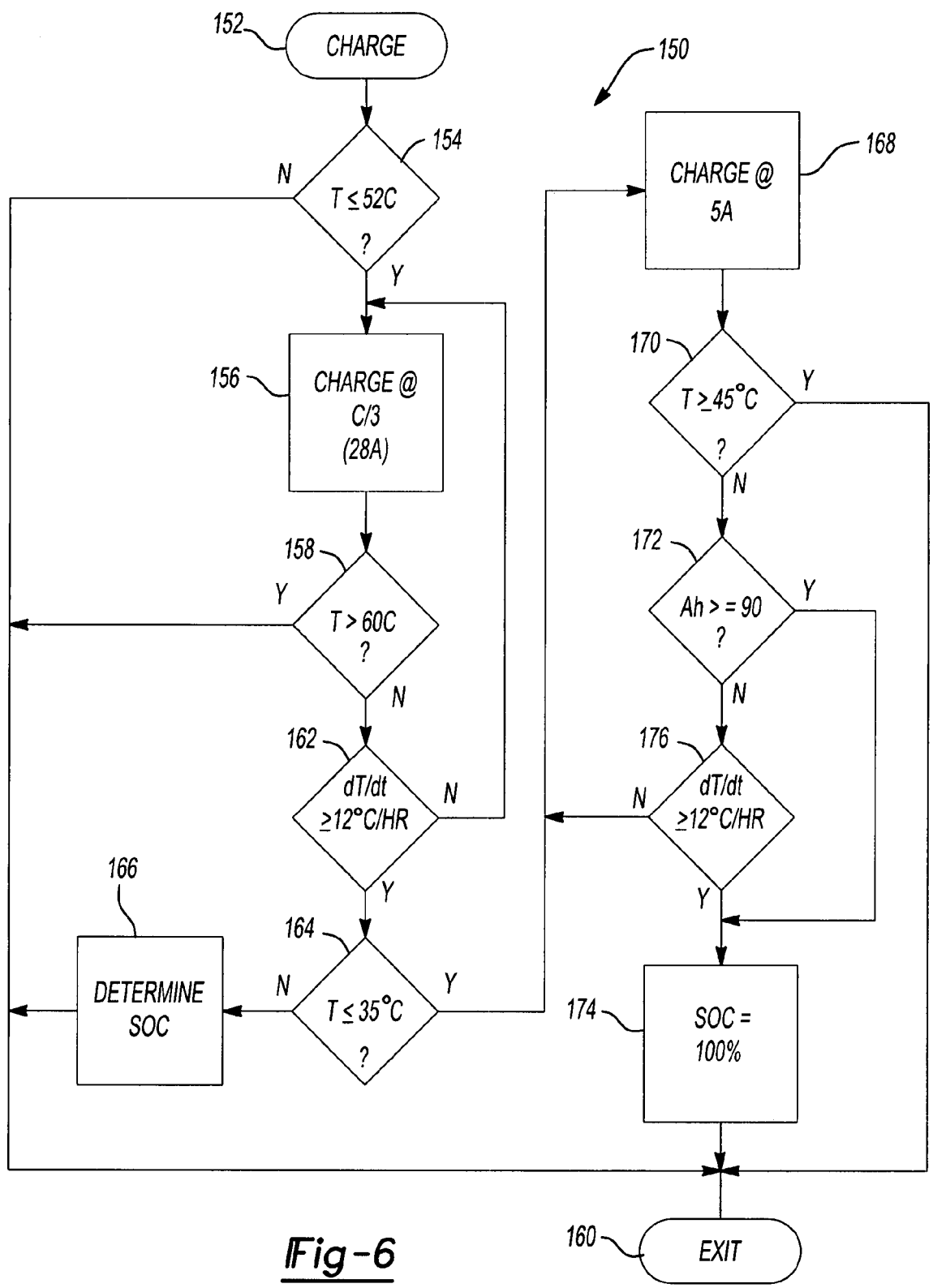
FIG. 6 is a method of operating a rechargeable DC power supply.

Referring now to FIG. 6, a method 150 is shown that can be used to charge the battery 20. The method 150 can be included in the computer software stored in the ROM 76 and executed by the CPU 74. Control begins in start block 152 and proceeds to decision block 154. In decision block 154, control determines whether the battery temperature is greater than a first predetermined temperature. By way of non-limiting example, the first predetermined temperature can be about 52 deg. C. Control proceeds to block 156 when the determination of decision block 154 yields an affirmative result. In block 156, control determines a charging current that is approximately equal to one-third of an amp*hour (Ah) rating of the battery 20. For example, if the battery has a rating of 85 Ah, then control will determine the charging current to be about 28 amperes.

Control proceeds from block 156 to block 158 and determines whether the battery temperature is greater that a second predetermined temperature. In some embodiments, the second predetermined temperature is, by way of non-limiting example, 60 deg. C. Control discontinues charging and proceeds to exit block 160 when the determination of decision block 158 yields an affirmative result. Alternatively, control proceeds to decision block 162 when the determination of decision block 158 yields a negative result. In decision block 162, control determines whether a battery temperature rate of change is greater than a predetermined rate of change. In some embodiments, by way of non-limiting example, the predetermined rate of change is about 12 deg. C/hr. Control returns to block 156 when the determination of decision block 162 yields a negative result. Alternatively, control proceeds to decision block 164 when the determination of decision block 162 yields an affirmative result.

In decision block 164, control determines whether the battery temperature is greater than a third predetermined temperature. In some embodiments, by way of non-limiting example, the third predetermined temperature is about 35 deg. C. When the determination of decision block 164 yields a negative result, control proceeds to block 166 and determines a state of charge (SOC) of the battery 20. In block 166, the SOC is determined by the equation SOC=100%−eff*(Tend−25 deg. C)

where eff is a predetermined charge acceptance efficiency of the battery 16 and Tend is the current battery temperature in deg. C. From block 166, control proceeds to exit block 160.

Alternatively, if the determination of decision block 164 yields an affirmative result, then control moves to block 168 and charges the battery at a predetermined current. In some embodiments, by way of non-limiting example, the predetermined current is approximately 5 amperes. Control then proceeds to decision block 170 and determines whether the battery temperature is above a fourth predetermined temperature. In some embodiments, by way of non-limiting example, the fourth predetermined temperature is approximately 45 deg. C. Control discontinues charging and proceeds to exit block 160 when the determination of decision block 170 yields an affirmative result. Alternatively, if the determination of decision block 170 yields a negative result, then control proceeds to decision block 172.

In decision block 172 control determines whether the battery 20 is sufficiently charged to provide at least 100% of its Ah rating. If the determination of decision block 172 returns an affirmative result, then control proceeds to block 174. Alternatively, if the determination in decision block 172 returns a negative result, then control proceeds to decision block 176. In decision block 176, control determines whether the battery temperature rate of change is greater than a second predetermined rate of change. In some embodiments, by way of non-limiting example, the second predetermined rate of change is about 12 deg. C/hr. Control returns to block 168 when the determination of decision block 176 yields a negative result. Alternatively, control proceeds to block 174 when the determination of decision block 176 yields an affirmative result. In block 174, control sets the SOC equal to 100%, discontinues charging, and then proceeds to exit block 160.

The applicant has found the various predetermined values disclosed herein to be suitable for use with a particular type of NiMH battery 16 having an 85 Ah rating. It is appreciated by those skilled in the art that the predetermined values will vary with the type and Ah rating of the battery 20.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A rechargeable DC power supply, comprising:
   a housing including an interior, an exterior, and an integral heat sink including a heat absorbing surface formed in said interior and a heat dissipating surface formed in said exterior;
   a rechargeable battery having battery terminals positioned in said interior;
   power supply terminals positioned at said exterior of said housing; and
   a first printed circuit board (PCB) assembly including a bidirectional DC-DC converter module connected between said battery terminals and said power supply terminals, said first PCB assembly being in coplanar contact with said heat absorbing surface.

2. The rechargeable DC power supply of claim 1 further comprising:
   a battery tray connected to said housing and containing said rechargeable battery.

3. The rechargeable DC power supply of claim 1, wherein said rechargeable battery comprises a plurality of rechargeable cells having cell terminals, further comprising:
   a second PCB assembly positioned on said cell terminals and having PCB traces connecting said cell terminals to form said battery terminals.

4. The rechargeable DC power supply of claim 1 wherein said housing nests on said rechargeable battery.

5. The rechargeable DC power supply of claim 3 further comprising:
   a battery temperature sensor positioned in proximity of said rechargeable battery and connected to said second PCB assembly.

6. The rechargeable DC power supply of claim 5 wherein said battery temperature sensor is located inside of said battery.

7. The rechargeable DC power supply of claim 1 further comprising:
   a control module positioned in said interior of said housing and having a data communication port; and
   a connector in communication with said data communication port and accessible from said exterior of said housing.

* * * * *